United States Patent
Chakarapani et al.

(10) Patent No.: US 8,266,420 B2
(45) Date of Patent: Sep. 11, 2012

(54) SYSTEM AND METHOD FOR PROVIDING SECURE CONFIGURATION FILE PROVISIONING

(75) Inventors: Lakshmi N. Chakarapani, Irving, TX (US); Rezwanul Azim, Lexington, MA (US); Robert H. Liao, Chestnut Hill, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 429 days.

(21) Appl. No.: 12/561,340

(22) Filed: Sep. 17, 2009

(65) Prior Publication Data

US 2011/0067096 A1    Mar. 17, 2011

(51) Int. Cl.
*H04L 29/06* (2006.01)
(52) U.S. Cl. ............................ 713/100; 713/1
(58) Field of Classification Search ............... 713/1, 100
See application file for complete search history.

(56) References Cited

U.S. PATENT DOCUMENTS

2006/0221940 A1 * 10/2006 Ong et al. ............... 370/352
2008/0151866 A1 * 6/2008 Wu .............................. 370/352

* cited by examiner

*Primary Examiner* — Jung Kim
*Assistant Examiner* — Ayoub Alata

(57) ABSTRACT

A system and method for providing secure configuration file exchange is disclosed. The system may include a Voice over Internet Protocol (VoIP) device having a receiver and a processor, and the VoIP device may be configured to: receive, at the receiver, an encrypted first configuration file from a server using a default Uniform Resource Locator (URL) stored in the VoIP device; decrypt, at the processor, the first configuration file using a default key stored in the VoIP device; apply, at the processor, a first set of profile parameters stored in the first configuration file, and the step of applying may include updating the default URL and the default key in the VoIP device with a new URL and a new key stored in the first configuration file; receive, at the receiver, an encrypted second configuration file from the server using the new URL; decrypt, at the processor, the second configuration file using the new key; and apply, at the processor, a second set of profile parameters stored in the second configuration file in order to provide network service from the server to a customer premise equipment (CPE) communicatively coupled to the VoIP device.

20 Claims, 4 Drawing Sheets

SYSTEM AND METHOD FOR PROVIDING SECURE CONFIGURATION FILE PROVISIONING

BACKGROUND INFORMATION

Voice over Internet Protocol ("VoIP") is a protocol designed for the transmission of voice through the Internet or other packet-switched networks. In general, when a subscriber orders a VoIP service, a service provider may ship a VoIP device to be used with the subscriber's communications device (e.g., customer premises equipment ("CPE")). The VoIP device may be used to convert data packets into analog voice and back, so that voice communication may achieved at the subscriber's particular communications device.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for providing secure configuration file exchange. That is, exemplary embodiments may, among other things, expand and optimize packet networks (e.g., VoIP, etc.) to effectively provide secure configuration file exchange using a unique encryption key.

As discussed above, a VoIP device (e.g., VoIP adapter) may be used to convert data packets into analog voice and back, so that voice communication may achieved at the subscriber's particular communications device. After the VoIP adapter is connected to a packet-switched network (e.g., Internet), the VoIP adapter may download and decrypt a configuration file using a decryption key in the VoIP adapter. However, burning the decryption key into every VoIP adapter before shipping to subscribers may put a heavy burden on the service provider to make sure that adapters are properly shipped to corresponding subscribers and that returned adapters are properly received and handled. Usage of a single key to encrypt files sent to all CPE may not provide a very secure model. Security may often compromised when the confidentiality of the decryption key in these VoIP adapters are not adequately maintained. For example, if the encryption key leaks to a hacker, the entire system and network may be exposed to attack. Therefore, maintaining confidentiality of an encryption key may be highly important for communications over packets-switched networks.

Although using Hypertext Transfer Protocol Secure (HTTPS) may provide a more secure model, many VoIP adapters do not support HTTPS. Furthermore, using HTTPS continues to place burden on the VoIP adapter as well as on the CPE provision server for processing. Thus, current systems using these VoIP adapters may not operate adequately in a file transmission mode using Trivial File Transfer Protocol (TFTP), Hypertext Transfer Protocol (HTTP), or even with HTTPS. As a result, as packet-switched networks continue to be used by consumers for various services (e.g., VoIP), current systems may not comprehensively and effectively provide secure configuration file exchange using a secured unique decryption key.

Figure 1:
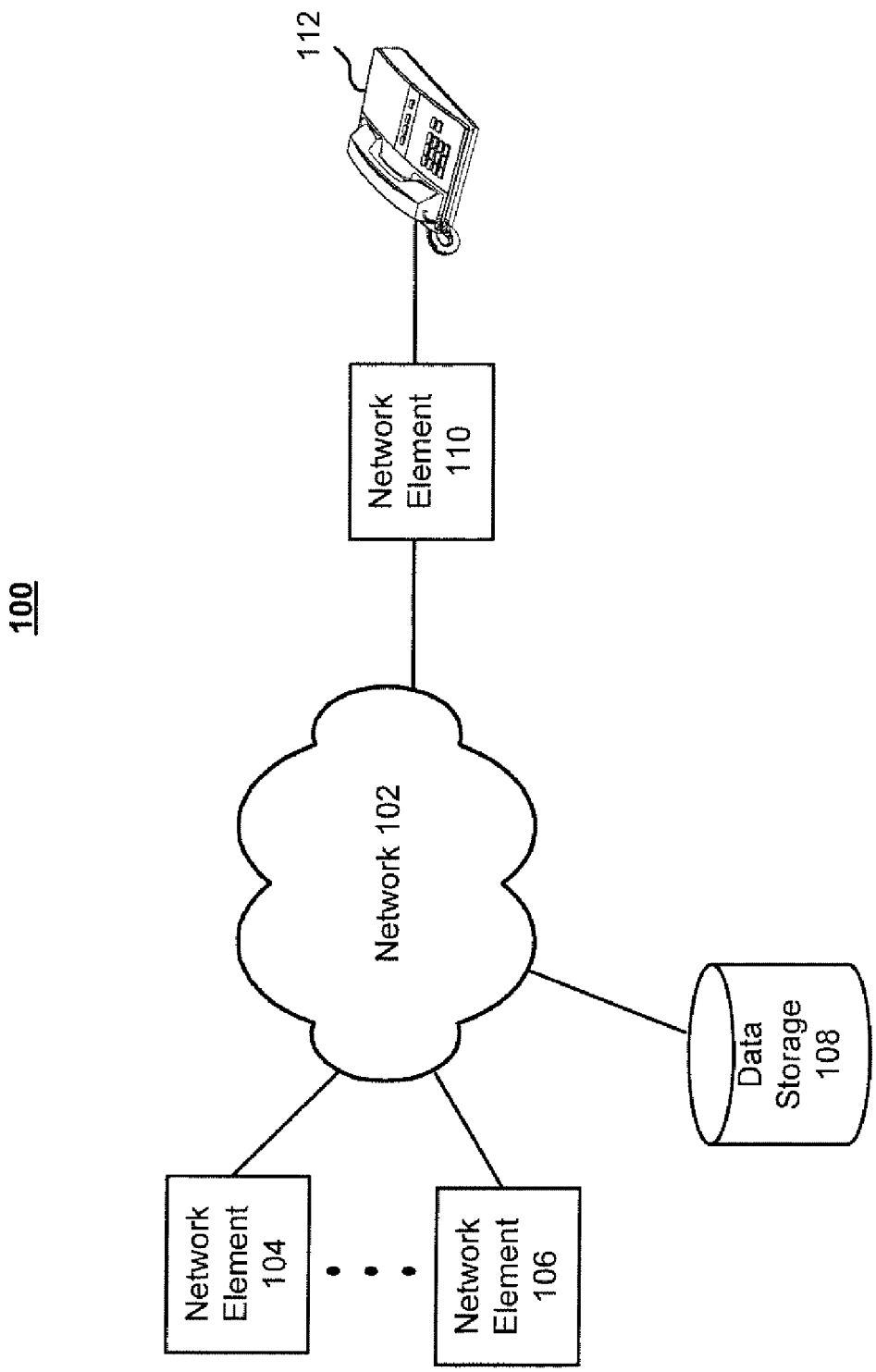
FIG. 1 depicts a block diagram of a system architecture for providing secure configuration file exchange, according to an exemplary embodiment of the present disclosure.

FIG. 1 depicts a block diagram of a system architecture for providing secure configuration file exchange, according to an exemplary embodiment of the present disclosure. As illustrated, network 102 may be communicatively coupled with one or more devices including network element 104, network element 106, data storage 108, and network element 110. Other devices may be communicatively coupled with network 102 via one or more intermediary devices, such as a transceiver, a wireline phone, or a network element 110. In some embodiments, network element 110 may be a network adapter or device (e.g., a VoIP adapter). It should also be appreciated that other various components may also be communicatively coupled with the network element 110, such as a network client 112 (e.g., a VoIP phone).

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, or home networks.

Network elements 104, 106, and 110, and data storage 108 may transmit and receive data to and from network 102 representing broadcast content, user request content, mobile communications data, or other data. The data may be transmitted and received utilizing a standard telecommunications protocol or a standard networking protocol. For example, one embodiment may utilize Session Initiation Protocol ("SIP").

In other embodiments, the data may be transmitted or received utilizing other Voice Over IP ("VOIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b, 802.11g, and 802.11n. Network 102 may also use protocols for a wired connection, such as an IEEE Ethernet 802.3.

Network elements 104, 106, and 110, and data storage 108 may include one or more processors for recording, transmitting, receiving, or storing data. Although network elements 104, 106, and 110, and data storage 108 are depicted as individual elements, it should be appreciated that the contents of one or more of a network elements 104, 106, and 110, and data storage 108 may be combined into fewer or greater numbers of devices and may be connected to additional devices not depicted in FIG. 1. Furthermore, the one or more devices may be local, remote, or a combination thereof a network elements 104, 106, 110, and data storage 108.

Data storage 108 may be network accessible storage and may be local, remote, or a combination thereof to network elements 104, 106, and 110. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

Network elements 104 and 106 may be one or more servers (or server-like devices). These may include a Session Initiation Protocol ("SIP") server, a provisioning server, a CPE server, a configuration download server, or other similar server or server-like device. Network elements 104 and 106 may include one or more processors (not shown) for recording, transmitting, receiving, or storing data. According to one or more embodiments, network elements 104 and 106 may be servers providing media content to one or more users. In other embodiments, network elements 104 and 106 may be servers that provide network connection between two or more electronic devices. Network elements 104 and 106 may also be servers of a service provider, the Internet, a broadcaster, a cable television network, or another media provider.

Network element 110 may be a residential gateway, such as a router, an optical network terminal or another piece of CPE providing access to one or more pieces of equipment. In some embodiments, network element 110 may also provide audio/video programming content feeds to a set-top box for multimedia distribution. In other embodiments, network element 110 may be a VoIP device (e.g., a VoIP adapter) that enables secure network connectivity for other network clients 112, such as a VoIP phone, in order to convert digital signals into analog voice for communication at network client 112.

The adapter may include a default Uniform Resource Locator ("URL") and a default key. It should be appreciated that the adapter may have one or more receivers, one or more transmitters, and/or one or more processors. For example, the adapter may use these components to receive, process, and/or transmit data, which may be communicated to/from network client 112 or the network elements 104 and 106. For instance, the adapter may be capable of using the default URL may direct the adapter to the location where a configuration file or other data may be retrieved or downloaded from network element 104 or 106. The default key may then be used by the adapter to decrypt the retrieved configuration file or other data. In another embodiment, the adapter may be able to receive and store the configuration file, which in turn may be used to receive another URL and encryption key to be used at the adapter. This may provide a secondary layer of security. It should be appreciated that the adapter may be realized as any device capable of receiving, transmitting, and/or processing signals.

Network client 112 may be a communications device, such as a wireline telephone or a VoIP phone. Network client 112 may also be a desktop computer, a laptop computer, a server, a personal digital assistant, or other computer capable of sending or receiving network signals (e.g., a CPE). These may include servers or server-like systems, modules, Personal Digital Assistants ("PDAs"), smart phones, cellular phones, mobile phones, satellite phones, MP3 players, video players, personal media players, personal video recorders ("PVR"), watches, gaming consoles/devices, navigation devices, televisions, printers, or appliances. Network client 112 may use a wired or wireless connection. Although depicted as connected via a residential gateway using an adapter in FIG. 1, it should be appreciated that the network client 112 may connect directly to network 102 or via other network connectivity devices as well. According to one or more embodiments, network client 112 using a wireless connection may authenticate with a network using Wired Equivalent Privacy ("WEP"), Wi-Fi Protected Access ("WPA"), or other wireless network security standards. It should be appreciated that the network client 112 may be mobile, handheld, or stationary. It should also be appreciated that network client 112 may be used independently or may be used as an integrated component in another device or system. For example, network client 112 may be fully or partially integrated with network element 110. Thus, a VoIP adapter, for example, may be fully integrated and function within a VoIP phone, rather than being separate and distinct components.

System 100 may be used for mobile telecommunications between two or more components of the system 100, e.g., two or more wireless devices, wireless device with network client, set top box with wireless device, landline phone, VoIP, etc. System 100 may also be used for transmitting or receiving multimedia content. The various components of system 100 as shown in FIG. 1 may be further duplicated, combined or integrated to support various applications and platforms. Additional elements may also be implemented in the systems described above to support various applications.

It should be appreciated that although embodiments are described primarily with providing secure communications, the systems and methods discussed above are provided as merely exemplary and may have other applications. These may include device tracking, comprehensive network maintenance/support, hardware/software delivery, marketing and advertisement-directed services, etc. It should also be appreciated that exemplary embodiments may support one or more additional security functions/features to provide secured communications for communications devices communicatively coupled to the adapter 104.

While depicted as networks, network components, servers, platforms, and/or devices, it should be appreciated that embodiments may be constructed in software and/or hardware, as separate and/or stand-alone, or as part of an integrated transmission and/or switching device/networks. For example, it should also be appreciated that the one or more networks, system components, servers, platforms, or devices of the system may not be limited to physical components. These components may be physical, software-based, virtual, etc. Moreover, the various components, servers, and/or devices may be customized to perform one or more additional features and functionalities. Also, although depicted as singular networks or system components, each of the various networks or system components may be equal, greater, or lesser.

Additionally, it should also be appreciated that system support and updating of the various components of the system may be easily achieved. For example, an administrator may have access to one or more of these networks or system components. Such features and functionalities may be provided via deployment, transmitting and/or installing software/hardware.

It should also be appreciated that each of the networks or system components may include one or more processors, servers, modules, and/or devices for optimizing equal access delivery. It should be appreciated that one or more data storage systems (e.g., databases) (not shown) may also be coupled to each of the one or more processors, servers, modules, and/or devices of the system to store relevant information for each of the servers and system components. Other various embodiments may also be provided. The contents of any of these one or more data storage systems may be combined into fewer or greater number of data storage systems and may be stored on one or more data storage systems and/or servers. Furthermore, the data storage systems may be local, remote, or a combination thereof to clients systems, servers, and/or other system components. In another embodiment, information stored in the databases may be useful in providing additional customizations for optimizing equal access implementation.

It should be appreciated that while providing a unique encryption key is described as being implemented at a VoIP adapter, embodiments may be implemented at one, all, or a combination of other system components. For example, network client 112 (e.g., a VoIP phone) may include all the features and functionalities of a VoIP adapter. Such a VoIP may therefore perform all the functions of the VoIP adapter described herein.

It should be appreciated that embodiments may include voice, data, multimedia (video, gaming, Internet Protocol Television ("IPTV"), Simple Messaging Service ("SMS")/Multimedia Messaging Service ("MMS"), and/or other communicable transmissions. These may include audio, video, and/or other various signals having data/information.

It should be appreciated that while exemplary embodiments are described as being implemented over wired networks and systems, other various embodiments may also be provided. For example, equal access may be implemented over wireless networks or systems. Whether wired or wireless, the network and/or system may be a local area network ("LAN"), wide area network ("WAN"), or any other network configuration. Additionally, various communication interfaces may be used. These may include an integrated services digital network ("ISDN") card or a modem to provide a data communication connection. In another embodiment, the communication interface may be a local area network ("LAN") card to provide a data communication connection to a compatible LAN. Wireless links (e.g., microwave, radio, etc.) may also be implemented. In any such implementation, the communication interface may send and receive electrical, electromagnetic, and/or optical signals that carry digital data streams representing various types of information.

In one embodiment, the wireline network/system may include long-range optical data communications, local area network based protocols, wide area networks, and/or other similar applications. In another embodiment, wireless broadband connection may include long-range wireless radio, local area wireless network such as Wi-Fi (802.11xx) based protocols, wireless wide area network such as Code Division Multiple Access ("CDMA")—Evolution Data Only/Optimized ("EVDO"), Global System for Mobile-Communications ("GSM")—High Speed Packet Access ("HSPA"), WiMax, infrared, voice command, Bluetooth, Long Term Evolution ("LTE"), and/or other similar applications. In yet another embodiment, the network with which communications are made may include the Internet or World Wide Web. Other networks may also be utilized for connecting each of the various devices, systems and/or servers.

Figure 2:
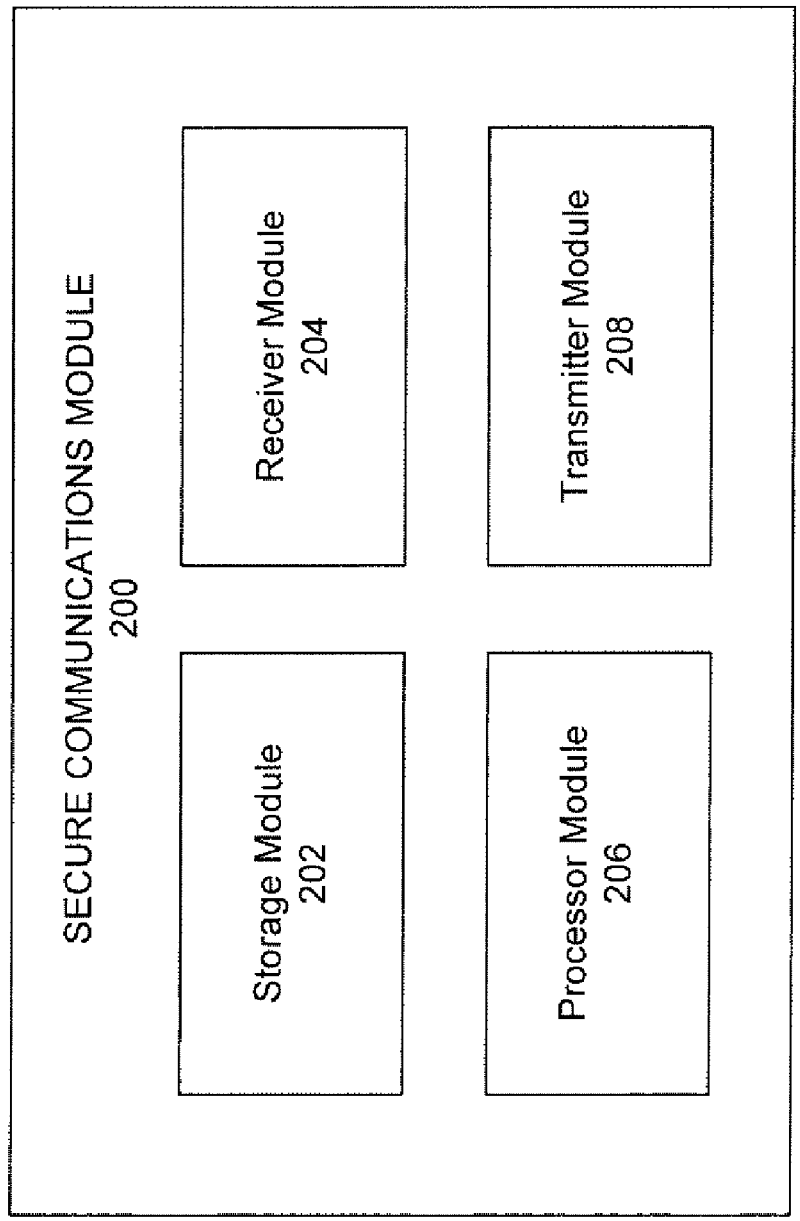
FIG. 2 depicts a hardware module component of a system for providing secure configuration file exchange, according to an exemplary embodiment.

FIG. 2 depicts a hardware module component of a system for providing secure configuration file exchange, according to an exemplary embodiment. Referring to FIG. 2, there is shown an secure communications module 200 for providing secure configuration exchange in accordance with an embodiment of the present disclosure. As illustrated, the secure communications module 200 may contain one or more components, such as a storage module 202, a receiver module 204, a processor module 206, and a transmitter module 208. Although the secure communications module 200 is depicted as a single module, functionality of the secure communications module 200 may be located on a single component or distributed across a plurality of components, such as one or more centralized servers, pieces of customer premises equipment, or end user devices. In some embodiments, components of secure communications module 200 may be incorporated within a wireless or wireline device, such as a VoIP adapter or phone.

Storage module 202 may manage or access electronic storage including databases and other organized electronic storage. Storage module 202 may provide one or more interfaces for the receiver module 204, processor module 206, or transmitter module 208. Storage module 202 may store data related to secure communications (e.g., secure configuration file exchange). Receiver module 204 may receive data related to secure communications. Processor module 206 may process received data. For example, processor module 206 may apply one or more parameters of a configuration received at receiver module 204. Transmitter module 208 may transmit data related to secure communications.

In some embodiments, the secure communications module 200 may provide secure configuration file exchange between a server and VoIP adapter. In some embodiments, the secure communications module 200 may be implemented server-side, e.g., with network elements 104 or 106 or network server. In other embodiments, the secure communications module 200 may be implemented client-side, e.g., with network element 110 or VoIP adapter.

Figure 3:
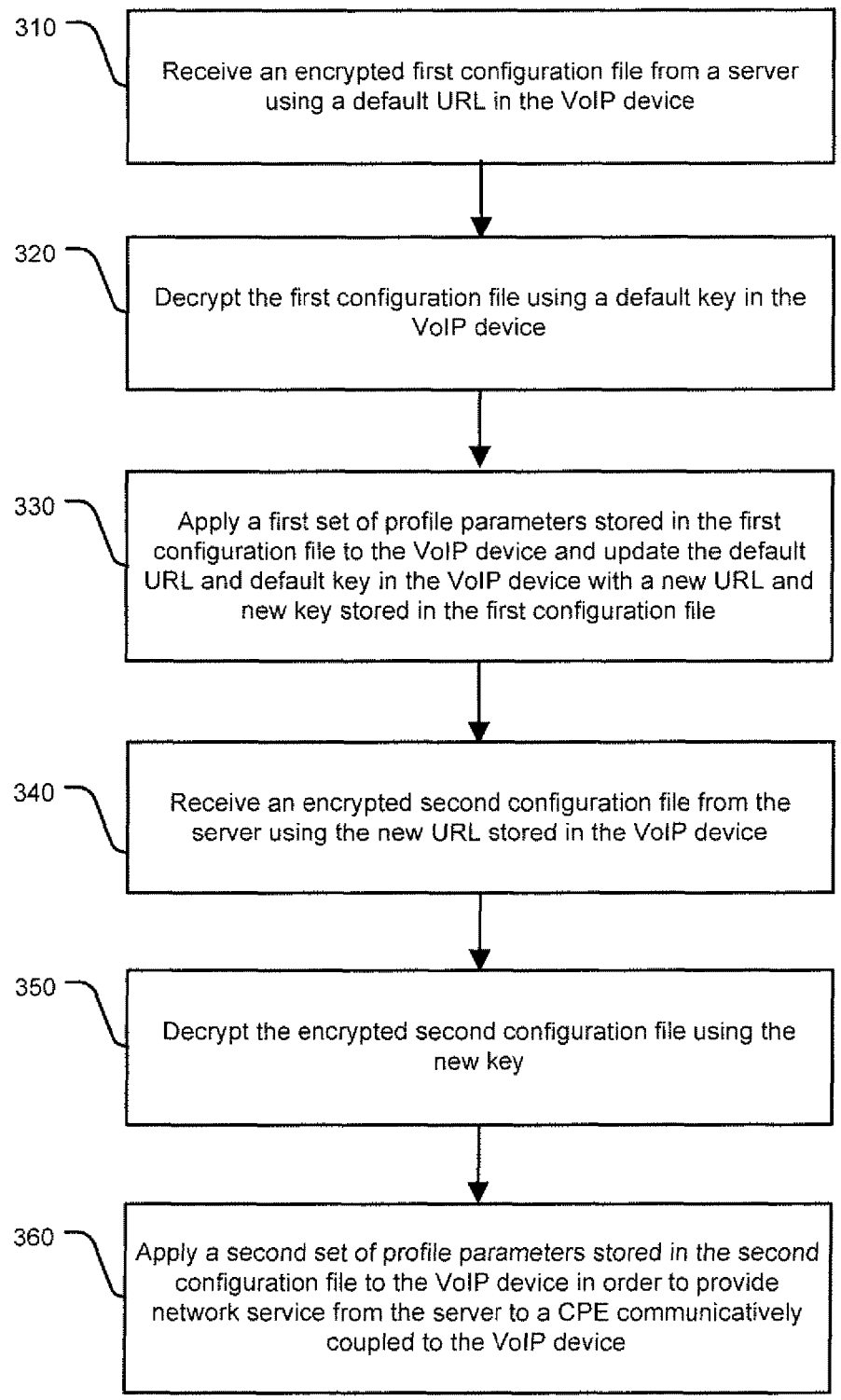
FIG. 3 depicts an illustrative flowchart of a method for providing secure configuration file exchange at a VoIP device, according to an exemplary embodiment.

FIG. 3 depicts an illustrative flowchart of a method for providing secure configuration file exchange at a VoIP adapter 300, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by at least system 100 in FIG. 1 and module configuration 200 in FIG. 2, by way of example, and various elements of systems 100 and 200 are referenced in explaining the exemplary method of FIG. 3. Each block shown in FIG. 3 represents one or more processes, methods, or subroutines carried in the exemplary method 300. A computer readable medium comprising code to perform the acts of the method 300 may also be provided. Referring to FIG. 3, the exemplary method 300 may begin at block 310.

At block 310, the receiver module 204 at network element 110 (e.g., a VoIP device), which is communicatively coupled to network client 112 (e.g., CPE or VoIP phone) may receive an encrypted first configuration file from network client 104 or 106 (e.g., a provisioning server) using a default Uniform Resource Locator (URL) stored in the VoIP device.

At block 320, the processor module 206 at network element 110 (e.g., a VoIP device) may decrypt the first configuration file using a default key stored in the VoIP device.

At block 330, the processor module 206 at network element 110 (e.g., a VoIP device) may apply a first set of profile parameters stored in the first configuration file. The processor module 206 at network element 110 (e.g., a VoIP device) may further update the default URL and default key in the VoIP device with a new URL and a new key stored in the first configuration file. The first set of profile parameters may be a set of Session Initiation Protocol (SIP) profile parameters comprising at least one of a first identification and first authentication password. It should be appreciated that in some embodiments updating the default URL and default key with the new URL and new key may comprise purging the default URL and default key from the VoIP device.

At block 340, the receiver module 204 at network element 110 (e.g., a VoIP device) may receive an encrypted second configuration file from the network client 104 or 106 (e.g., a provisioning server) using the new URL stored in the VoIP device.

At block 350, the processor module 206 at network element 110 (e.g., a VoIP device) may decrypt the second configuration file using the new key, which may also be stored in the VoIP device.

At block 360, the processor module 206 at network element 110 (e.g., a VoIP device) may apply a second set of profile parameters stored in the second configuration file in order to provide network service from the server to the VoIP device. In some embodiments, the VoIP device may be a VoIP adapter communicatively coupled to a customer premise equipment ("CPE"). In other embodiments, the VoIP device may be a CPE that has a fully or partially integrated VoIP adapter. The second set of profile parameters may be a set of Session Initiation Protocol ("SIP") profile parameters comprising at east one of a second identification and second authentication password.

Figure 4:
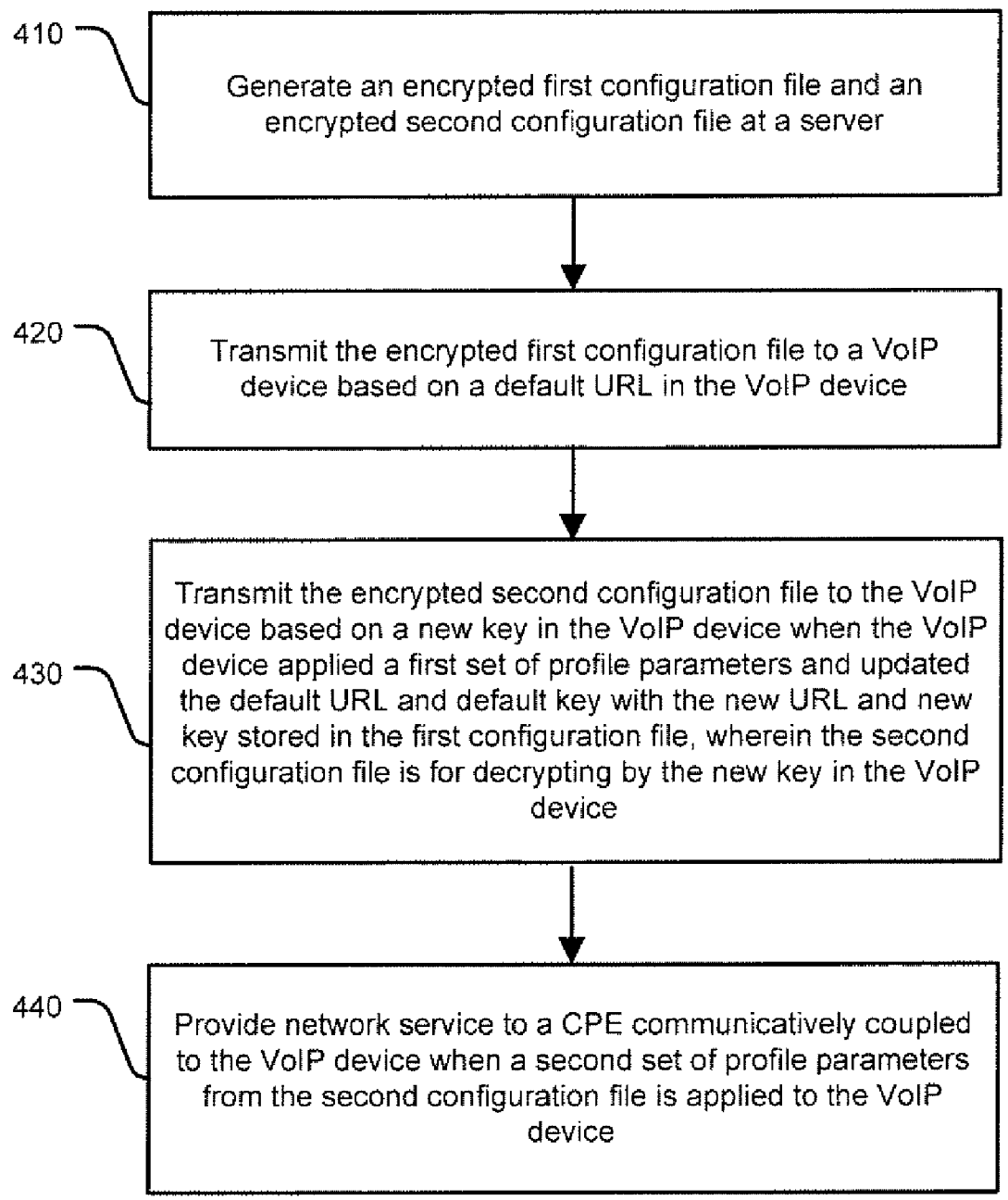
FIG. 4 depicts an illustrative flowchart of a method for providing secure configuration file exchange at a server, according to another exemplary embodiment.

FIG. 4 depicts an illustrative flowchart of a method for providing secure configuration file exchange at a server, according to another exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 100 in FIG. 1 and module configuration 200 in FIG. 2, by way of example, and various elements of systems 100 and 200 are referenced in explaining the exemplary method of FIG. 4. Each block shown in FIG. 4 represents one or more processes, methods, or subroutines carried in the exemplary method 400. A computer readable medium comprising code to perform the acts of the method 400 may also be provided. Referring to FIG. 4, the exemplary method 400 may begin at block 410.

At block 410, the processor module 206 of network elements 104 or 106 (e.g., provisioning server) may generate an encrypted first configuration file and an encrypted second configuration file. It should be appreciated that the encrypted first configuration file and the encrypted second configuration file may be generated when the network element 110 (e.g., VoIP device) is shipped to a customer or subscriber.

At block 420, the transmitter module 208 of network elements 104 or 106 (e.g., provisioning server) may transmit the encrypted first configuration file to the network element 110 (e.g., VoIP device). The first configuration file may be transmitted based on a default URL stored in the VoIP device. The first configuration file may be decrypted by a default key stored in the network element 110 (e.g., VoIP device). Once decrypted, a first set of profile parameters may be applied and the default URL and default key may be updated with the new URL and key stored in the decrypted first configuration file. The first set of profile parameters may be a set of Session Initiation Protocol ("SIP") profile parameters comprising at least one of a first identification and first authentication password. It should be appreciated that once the first configuration file is transmitted using the default key, access to the first configuration file (e.g., repeat use of the default key) may be blocked.

At block 430, the transmitter module 208 of network elements 104 or 106 (e.g., provisioning server) may transmit the encrypted second configuration file to the VoIP device. The encrypted second configuration file may be transmitted based on the new URL, which was obtained by the VoIP device from the first configuration file. The second configuration file may be decrypted by the VoIP device with the new key, which may also be provided by the first configuration file. Once the second configuration file is decrypted, a second set of profile parameters may be applied. The second set of profile parameters may be a set of Session Initiation Protocol ("SIP") profile parameters comprising at least one of a second identification and second authentication password.

At block 440, the network element 104 or 106 may provide network service to the network element 110 (e.g., a customer premise equipment ("CPE")) communicatively coupled to the network client 112 (e.g., VoIP device) when the second set of profile parameters stored in the second configuration file is applied at the VoIP device. In some embodiments, the VoIP device may be a VoIP adapter communicatively coupled to a customer premise equipment ("CPE"). In other embodiments, the VoIP device may be a CPE that has a fully or partially integrated VoIP adapter.

By performing the various features and functions as discussed above, the systems and methods described above may allow secure communications (e.g., configuration file exchange) over a network by providing a unique encryption key for adapters or other devices used at subscriber-side devices.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

We claim:

1. A system, comprising:
a Voice over Internet Protocol (VoIP) device comprising a receiver and a processor, wherein the VoIP device is configured to:
receive, at the receiver, an encrypted first configuration file from a server using a default Uniform Resource Locator (URL) stored in the VoIP device;
decrypt, at the processor, the first configuration file using a default key stored in the VoIP device;
apply, at the processor, a first set of profile parameters stored in the first configuration file, wherein applying further comprises updating the default URL and the default key in the VoIP device with a new URL and a new key stored in the first configuration file;
receive, at the receiver, an encrypted second configuration file from the server using the new URL;
decrypt, at the processor, the second configuration file using the new key; and
apply, at the processor, a second set of profile parameters stored in the second configuration file in order to provide network service from the server to the VoIP device.

2. The system of claim 1, wherein the first set of profile parameters is a set of Session Initiation Protocol (SIP) profile parameters comprising at least one of a first identification and first authentication password.

3. The system of claim 1, wherein the second set of profile parameters is a set of Session Initiation Protocol (SIP) profile parameters comprising at least one of a second identification and second authentication password.

4. The system of claim 1, wherein updating the default URL and the default key with the new URL and the new key comprises purging the default URL and default key from the VoIP device.

5. A method, comprising:
receiving, at a Voice over Internet Protocol (VoIP) device, an encrypted first configuration file from a server using a default Uniform Resource Locator (URL) stored in the VoIP device;
decrypting, at a Voice over Internet Protocol (VoIP) device, the first configuration file using a default key stored in the VoIP device;
applying, at the VoIP device, a first set of profile parameters stored in the first configuration file, wherein applying further comprises updating the default URL and the default key in the VoIP device with a new URL and a new key stored in the first configuration file;
receiving, at the VoIP device, an encrypted second configuration file from the server using the new URL;
decrypting, at a Voice over Internet Protocol (VoIP) device, the second configuration file using the new key; and
applying, at the VoIP device, a second set of profile parameters stored in the second configuration file in order to provide network service from the server to the VoIP device.

6. The method of claim 5, wherein the first set of profile parameters is a set of Session Initiation Protocol (SIP) profile parameters comprising at least one of a first identification and first authentication password.

7. The method of claim 5, wherein the second set of profile parameters is a set of Session Initiation Protocol (SIP) profile parameters comprising at least one of a second identification and second authentication password.

8. The method of claim 5, wherein updating the default URL and the default key with the new URL and the new key comprises purging the default URL and default key from the VoIP device.

9. A non-transitory computer readable medium comprising code to perform the acts of the method of claim 7.

10. A system, comprising:
a server system comprising a processor and a transmitter, wherein the server system is configured to:
generate, at the processor, a first configuration file and a second configuration file;
transmit, from the transmitter, an encrypted first configuration file to a Voice over Internet Protocol (VoIP) device based on a default URL stored in the VoIP device for decryption by a default key in the VoIP device;
transmit, from the transmitter, an encrypted second configuration file to the VoIP device, based on a new URL stored in the VoIP device, wherein the new URL and a new key is stored in the VoIP device when the VoIP device applied a first set of profile parameters and updated the default URL and default key with the new URL and key stored in the decrypted first configuration file, and wherein the second configuration file is for decryption by the new key in the VoIP device; and
providing network service from the server to the VoIP device when a second set of profile parameters stored in the second configuration file is applied at the VoIP device.

11. The system of claim 10, wherein the first set of profile parameters is a set of Session Initiation Protocol (SIP) profile parameters comprising at least one of a first identification and first authentication password.

12. The system of claim 10, wherein the second set of profile parameters is a set of Session Initiation Protocol (SIP) profile parameters comprising at least one of a second identification and second authentication password.

13. The system of claim 10, further comprising blocking access to the encrypted first configuration file using the default URL after the first configuration file is transmitted to the VoIP device.

14. A method, comprising:
generating, at a server, a first configuration file and a second configuration file;
transmitting, from the server, an encrypted first configuration file to a Voice over Internet Protocol (VoIP) device based on a default URL stored in the VoIP device for decryption by a default key in the VoIP device;
transmitting, from the server, an encrypted second configuration file to the VoIP device, based on a new URL stored in the VoIP device, wherein the new URL and a new key is stored in the VoIP device when the VoIP device applied a first set of profile parameters and updated the default URL and default key with the new URL and key stored in the decrypted first configuration file, and wherein the second configuration file is for decryption by the new key in the VoIP device;
providing network service from the server to the VoIP device when a second set of profile parameters stored in the second configuration file is applied at the VoIP device.

15. The method of claim 14, wherein the first set of profile parameters is a set of Session Initiation Protocol (SIP) profile parameters comprising at least one of a first identification and first authentication password.

16. The method of claim 14, wherein the second set of profile parameters is a set of Session Initiation Protocol (SIP) profile parameters comprising at least one of a second identification and second authentication password.

17. The method of claim 14, further comprising blocking access to the encrypted first configuration file using the default URL after the first configuration file is transmitted to the VoIP device.

18. A non-transitory computer readable medium comprising code to perform the acts of the method of claim 17.

19. The system of claim 1, wherein the new key stored in the first configuration file is unique to the VoIP device.

20. The system of claim 1, wherein the new URL stored in the first configuration file is unique to the VoIP device.

* * * * *